Aug. 13, 1968 HIROSHI OKANO 3,397,312
LAMINATED X-RAY ANALYZING CRYSTAL WHEREIN THE RESPECTIVE
LAMINATIONS HAVE DIFFERENT LATTICE SPACINGS
Filed Aug. 16, 1965 3 Sheets-Sheet 1
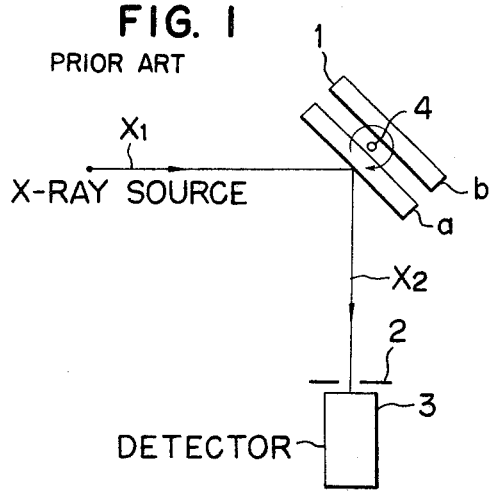
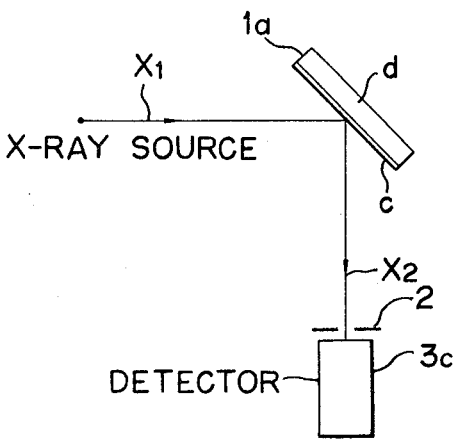
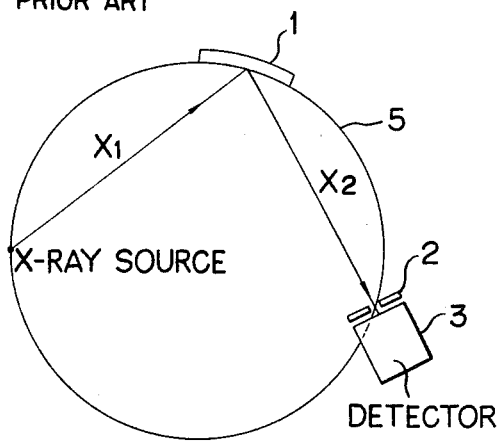
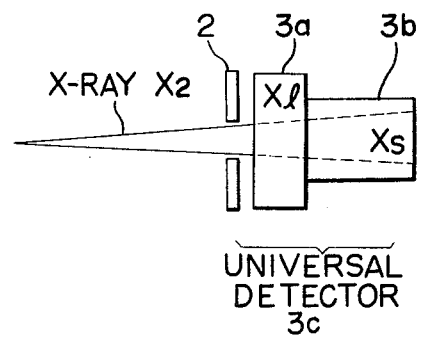
INVENTOR.
HIROSHI OKANO
H. Edward Mestern INVENTOR.
HIROSHI OKANO
H. Edward Mestern United States Patent Office 3,397,312
Patented Aug. 13, 1968

3,397,312
LAMINATED X-RAY ANALYZING CRYSTAL
WHEREIN THE RESPECTIVE LAMINATIONS
HAVE DIFFERENT LATTICE SPACINGS
Hiroshi Okano, Hachioji-shi, Tokyo-to, Japan, assignor to Kabushiki Kaisha Hitachi Seisakusho, Chiyoda-ku, Tokyo-to, Japan, a joint-stock company of Japan
Filed Aug. 16, 1965, Ser. No. 479,784
Claims priority, application Japan, Aug. 15, 1964, 39/46,925
1 Claim. (Cl. 250—51.5)

ABSTRACT OF THE DISCLOSURE

An X-ray analysis detecting device which has an analyzing element consisting of a first analyzing crystal having relatively narrow lattice spacing, laminated to a second analyzing crystal of comparatively wide lattice spacing, so that X-rays emitted from a specimen are diffracted at these crystals corresponding to their wavelengths. The detecting device comprises two different detectors having energy resolving power, whose output is connected to a pulse height analyzer. The analysis wave-length ranges of the latter are changeable in cooperation with changing operation of the two detectors.

---

Figure 6:
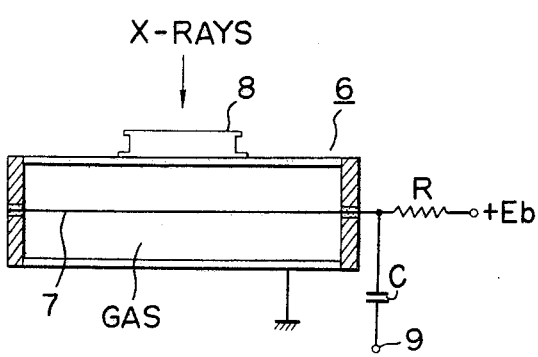

This invention relates to X-ray analysis apparatuses and more particularly to a new X-ray spectroscopic apparatus in which the wavelength coverage of diffraction elements is substantially expanded.

In general, the analyzing crystal of an X-ray spectrometer is selected to be suitable for the objective analysis wavelength range and thus used, but, frequently, there occur cases wherein the wavelength range of the objective X-rays cannot be covered by a single analyzing crystal. For example, in order to analyze elements from magnesium to uranium by using their K- or L-characteristic X-rays, it is necessary to diffract X-rays of a wavelength range of from 0.7 to 10 angstroms as objects of analysis. In this case, if only a single kind of analyzing crystal is used and diffraction angles of said crystal become very small, X-ray analysis will be technically difficult. For this and other reasons, it is the common practice to use two or three kinds of analyzing crystals of different lattice spacings (or lattice parameters).

By the techniques of the prior art, however, certain difficulties are encountered as will be more fully described hereinafter.

It is a general object of the present invention to overcome these difficulties of the prior art.

More specifically, the first object of the invention is to provide an X-ray analysis apparatus whereby X-ray analysis over a wide range of wavelengths is made possible without changing of analyzing crystals.

The second object of the invention is to provide an X-ray analysis apparatus wherein analysis is facilitated by affording complete selectability of the analysis wavelength.

The foregoing objects and other objects and advantages have been achieved by the present invention, which, briefly stated, resides in an X-ray analysis apparatus comprising an analyzing element consisting of a laminated assembly of an analyzing crystal having a relatively narrow lattice spacing and an analyzing crystal having a relatively wide lattice spacing, means to project X-rays to be dispersed to the analyzing element, and an X-ray detector for detecting diffracted X-rays dispersed by the analyzing element.

Figure 7:
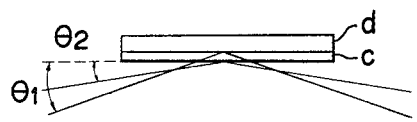
Figure 8A:
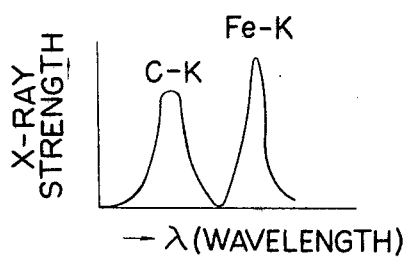
Figure 9:
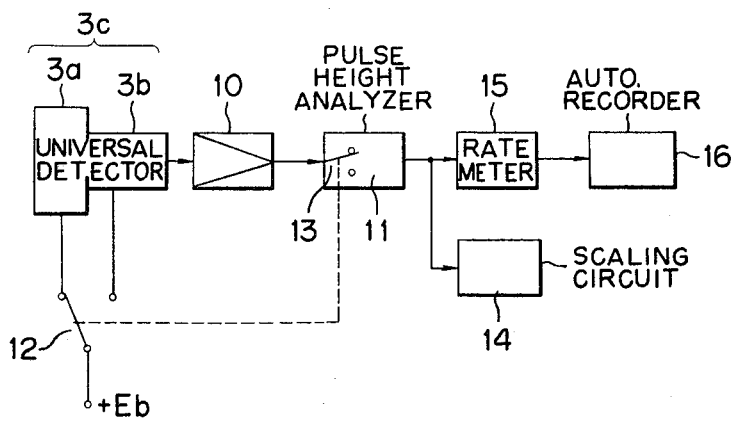
Figure 10:
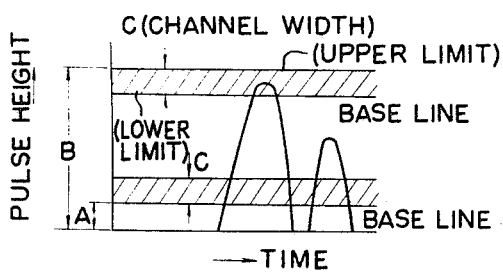
Figure 11:
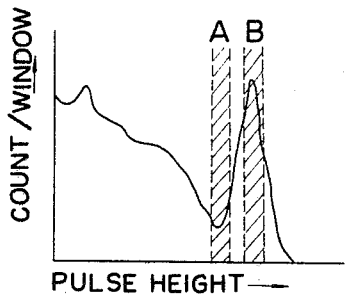
Figure 13:
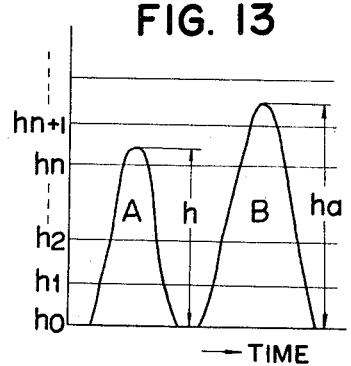
Figure 15:
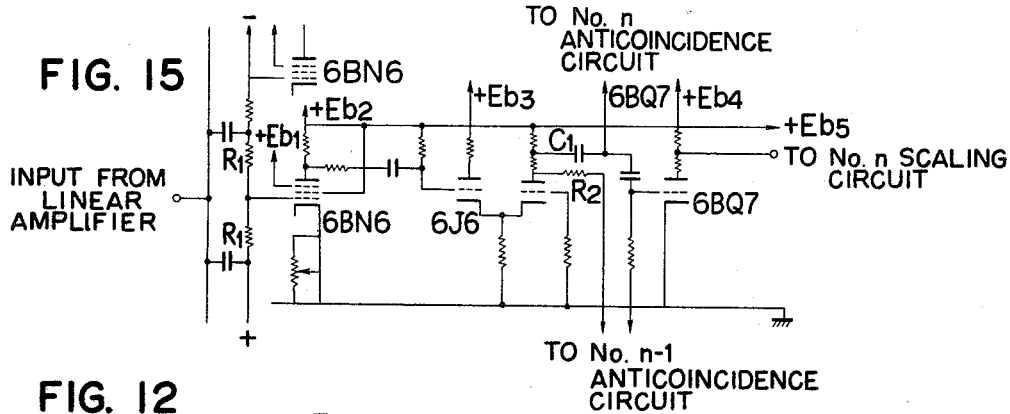
Figure 12:
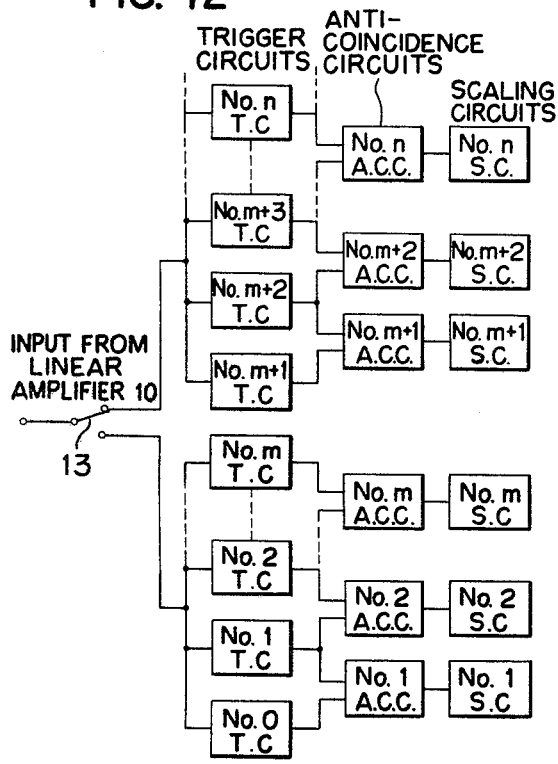
Figure 14:
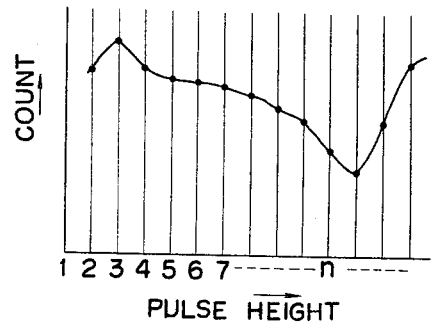

The nature, principle, and details of the invention will be more clearly apparent from the following detailed description when read in conjunction with the accompanying drawings in which like parts are designated by like reference characters and letters, and in which:

FIGS. 1 and 2 are schematic views indicating examples of X-ray analysis apparatus of known type;
FIG. 3 is a simplified view showing a curved (or bent) analyzing crystal;
FIG. 4 is a schematic view indicating the essential parts of a preferred embodiment of the invention;
FIG. 5 is a schematic side view showing an X-ray detector suitable for use in the apparatus according to the invention;
FIG. 6 is a schematic diagram, partly in section, showing a proportional counter suitable for use in the apparatus of the invention;
FIG. 7 is a simplified view showing an X-ray analyzing element according to the invention;
FIG. 9 is a block diagram showing another embodiment of the invention;
FIGS. 8, 10, and 11 are graphical representations for description of the operation of the embodiment of the invention shown in FIG. 9;
FIG. 12 is a block diagram showing a further embodiment of the invention;
FIGS. 13 and 14 are graphical representations for description of the embodiment of the invention shown in FIG. 12; and
FIG. 15 is a circuit diagram showing the essential circuit of the example apparatus shown in FIG. 12.

As conducive to a full appreciation of the nature and utility of the present invention, the following general consideration of the prior art is first presented for the purpose of comparison.

Heretofore, in order to cover a wide wavelength range as mentioned hereinbefore with a single X-ray spectrometer, a plurality of analyzing crystals of respectively different lattice spacings were used interchangeably according to necessity, or a plurality of analyzing crystals were used in combined assemblies which are rotatable as indicated in FIG. 1.

For example, in the technique illustrated in FIG. 1, an X-ray beam $X_1$ emitted from a specimen (not shown) is dispersed by means of a combination analyzing crystal 1, and the resulting diffracted X-ray beam $X_2$ is introduced by means of a receiving slit 2 into an X-ray detector 3. The combination analyzing crystal 1 consists of crystal $a$ having a lattice spacing suitable for the dispersion of X-rays of relatively short (hard) wavelength and a crystal $b$ having a lattice spacing suitable for the dispersing of X-rays of relatively long (shoft) wavelength. These crystals are supported by a crystal holder (not shown) having a center 4, about which the combination crystal assembly is rotatable.

When the X-ray beam $X_1$ from the source is of relatively short wavelength, dispersion is accomplished with the crystal $a$ placed in the position shown in FIG. 1. When the X-ray beam $X_1$ is of relatively long wavelength, the combination crystal 1 is rotated to place the crystal $b$ in the position formerly occupied by crystal $a$, and dispersion is thus carried out.

However, when the wavelengths of the X-rays to be dispersed are 3 angstroms or longer, the absorption of the X-rays due to air becomes remarkable. Accordingly, in order to prevent this absorption of the X-rays, it is necessary to enclose the X-ray spectrometer within an evacuated vessel or a vessel with a gas such as hydrogen gas sealed therewithin. In such a case, the above described technique of changing crystals is difficult, and, moreover, if the spectrometer is of the focusing type, even a slight deviation in the setting position of the analyzing crystal will have a great influence on the diffraction conditions as will be apparent from the following specific consideration.

Referring to FIG. 2 schematically showing a conventional focusing-type X-ray spectrometer, there are provided a curved crystal 1, a slit 2, a detector 3, and an X-ray source which are so arranged on a Rowland circle 5 as to satisfy the required focusing conditions. If, in this spectrometer, the aforementioned crystals are prepared to function as the curved crystal 1 and used interchangeably as necessary, the allowable deviation determined from the diffraction conditions, in the setting position of the crystal to be used as indicated in FIG. 3 will be as follows:

$\Delta e \doteqdot 40$ μm. (in the case of a Rowland circle 5 of 100-mm. diameter)

$\Delta \theta \doteqdot 3$ minutes of angle

Mechanically, it is considerably difficult to reproduce consistently the setting position of the crystals within the above range of error when the crystals are to be changed.

The present invention contemplates the use of an analyzing element formed by combining in laminar disposition an analyzing crystal having a relatively narrow lattice spacing to achieve the aforestated first object of the invention, that is, to afford X-ray analysis over a wide wavelength range without the above described exchanging of crystals, thereby to overcome the above described difficulties of the prior art.

The present invention further contemplates the use of the above mentioned analyzing element in an X-ray analysis apparatus wherein the range of energy analysis can be varied in accordance with the analysis wavelength range of said analyzing element by the use of an X-ray detector having energy resolving power and a pulse-height analyzer to achieve the aforestated second object of the invention, that is, to afford complete selectability of the analysis wavelength thereby to facilitate analysis.

The principle of the invention is indicated in FIG. 4, in which the parts are the same as those shown in FIG. 1 except for the constructional features of the analyzing element $1_a$ and detector $3_c$ which are different from those of the apparatus shown in FIG. 1. More specifically, the analyzing element $1_a$ consists of a laminated combination of crystals $c$ and $d$ of mutually different lattice spacings. The lattice spacing of the crystal $c$ is wider than that of the crystal $d$, the crystals $c$ and $d$ being adapted to disperse X-rays of long and short wavelengths, respectively. The absorption due to the crystal $c$ of X-rays dispersed by the crystal $d$ is amply reduced by suitably selecting the thickness of the crystal $c$ and its constituent element.

For the detector $3_c$, interchangeable detectors for example a detector $3_a$ for long wavelengths and a detector $3_b$ for short wavelengths, may be prepared and used interchangeably, the detector $3_a$ being used to detect diffracted X-rays $X_e$ of long wavelength dispersed by the crystal $c$ of the analyzing element 1, and the detector $3_b$ being used to detect diffracted X-rays $X_s$ of short wavelength dispersed by the crystal $d$. By this method, it is necessary to interchange only the detectors to suit the analysis wavelength.

Alternatively, a so-called universal type detector consisting of the detectors $3_a$ and $3_b$ coupled in tandem arrangement as shown in FIG. 5 may be used. In this case, the diffracted X-rays $X_e$ and $X_s$ are simultaneously detected in their respective detectors $3_a$ and $3_b$, whereby there is no necessity of interchanging detectors.

Examples of known detectors of this type are proportional counters as illustrated by one example in FIG. 6 and scintillation counters in which radiation is utilized, these counters being detectors which have energy resolving power. As is known, a proportional counter has a tube 6 filled with a gas such as argon, krypton, or xenon and provided with an electrode 7 and a window 8. When X-rays are projected into the tube 6 through the window 8 while a high voltage $E_b$ is applied through a resistance R to the electrode 7, ionization occurs, and pulses are obtained through a capacitor C at an output terminal 9. The magnitudes of these pulses are proportional to the energies of the incident X-rays and, therefore, are inversely proportional to the wavelengths of the X-rays.

When counters of this type are adapted to function as a universal type detector as shown in FIG. 5, it is necessary to fabricate the proportional counter corresponding to detector $3_a$ for long wavelengths with a thin window 8 so that the counter will be suitable for measurement of X-rays of long wavelengths (for example, of the order of from 3 to 100 angstroms). In a counter tube of this type, however, since it is almost impossible to avoid occurrences of holes in the thin film of the window 8, it is difficult to maintain the interior gas in a tightly sealed-in state. Accordingly, it is desirable to use a proportional counter of the gas-flow type which is operated as a gas such as, for example, a mixture of 90 percent of argon and 10 percent of $CH_4$, is constantly caused to flow within the tube.

In a focusing type X-ray spectrometer, since the allowable deviation in its Rowland circle diameter is of the order of 0.05 percent, there is the possibility of the diffraction conditions or the focusing conditions of either crystal $c$ or crystal $d$ being disturbed if the thickness of the crystal $c$ is great. However, if the Rowland circle diameter is, for example, 200 mm., and the thickness of the crystal $c$ is made amply small, that is, of the order of 0.1 mm. or less, the spectrometer performance will not be affected, and there will be no problem whatsoever.

Furthermore, there is the possibility of admixture of higher-order diffraction X-rays due to the crystal $c$ during analysis with the crystal $d$. However, by amply separating the lattice spacings of these crystals $c$ and $d$, the diffraction lines of the X-rays within the wavelength region to be covered by the crystal $d$ can be caused to be of an amply higher-order of diffraction, whereby the intensity of said higher-order diffraction X-rays will become low and will not present any problems.

For example, if the lattice spacings of the crystals $d$ and $c$ are respectively selected to be 2 and 50 angstroms, the following relationships will be valid, from Bragg's diffraction condition equation, in the case when Cu-K rays (1.54 angstrom) are dispersed.

For crystal $d$:

$$2 \times 2 \sin \theta_1 n_1 = n_1 \times 1.54 \quad (1)$$

For crystal $c$:

$$2 \times 50 \sin \theta_2 n_2 = n_2 \times 1.54 \quad (2)$$

Where $n_1$ and $n_2$ are orders of diffraction.

Therefore, when the case wherein the diffraction angles $\theta_1$ and $\theta_2$ as shown in FIG. 7 are equal is considered, the relationship of $n_2 = 25 n_1$ is obtained from Equations 1 and 2. That is, this means that X-rays of the order one due to the crystal $d$ and X-ray of the order 25 coexist as a mixture. In general, the presence of high-order X-rays is not desirable because it complicates analysis of the dispersion results. However, by combining crystals of amply separated lattice spacings as in the above example, only X-rays of very higher-order diffraction and, consequently, of amply low intensity are admixed, whereby no problem arises in actual practice.

The aforementioned output pulses of the proportional counter are amplified by an amplifier and then passed immediately through a pulse shaper circuit into a counter circuits, where the number of pulses within a specific time period is determined, or the time in which a specific count is reached is measured. Alternatively, the pulses are introduced into a rate meter, and the count per unit time is read by means of an ammeter or recorded by a recording device.

In the case where a detector having energy resolving power, such as a proportional counter, is used for the spectrometer detector, since the magnitudes of the output pulses thereof are proportional to the X-ray photon quanta, it is possible to pass only pulses of pulse heights within a certain range in accordance with the wavelength range of the diffracted X-rays by amplifying the detector output pulses in a linear amplifier and then introducing the pulses so amplified into a pulse height analyzer in which the analysis range can be varied. Therefore, only diffracted X-rays of the objective wavelength range can be selected and measured, and it is thereby possible to facilitate analysis of the measured results and, moreover, to increase the accuracy of the measurements.

For example, when iron is the specimen, and the carbon therein is being analyzed, long wavelength X-rays C-K and short wavelength X-rays Fe-K are present as diffracted X-rays resulting from the dispersion of the characteristic X-rays emitted from the said specimen by the respective crystals $c$ and $d$ of the aforementioned analyzing element. In such a case, although these diffracted X-rays are sorted by the wavelength characteristics of the detector, they are not perfect as indicated in FIG. 8a. The appearance of both C-K and Fe-K in the spectrum resulting from analysis causes the analytical procedure to become complicated, giving rise to a lowering of the accuracy of measurement in some cases.

Figure 8B:
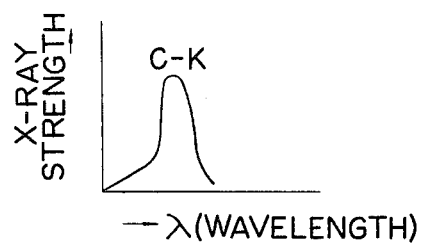

It is possible to overcome this difficulty and obtain a distinct spectrum as indicated in FIG. 8b by using in combination, as mentioned above, a detector having energy resolving power such as a proportional counter and a pulse-height analyzer capable of varying its analysis range in order to eliminate detection signals due to diffracted X-rays of unnecessary wavelength range.

One example of specific composition and arrangement of components for producing a distinct spectrum as above described is shown in FIG. 9. By this arrangement, the output of the detector 3 (combination of detectors $3_a$ and $3_b$) is linearly amplified by a linear amplifier 10, and the resulting amplified output is introduced into a pulse-height analyzer 11 through a switch 13 for changing the analysis range. The detector 3 is of the universal type in which aforedescribed proportional counters are used and is supplied with high voltage from a source $E_b$ through a change-over switch 12. The switches 12 and 13 cooperate and only the signals due to the diffracted X-rays of the wavelength range covered principally by the detector $3_a$ or $3_b$ under operating are selectively sorted and recorded.

For the pulse-height analyzer 11, a single-channel pulse-height analyzer or a multichannel pulse-height analyzer may be used.

The operational features of a single-channel pulse-height analyzer are utilized in the following manner in apparatus of this invention. Voltage pulses proportional to the energy of the incident X-rays are detected by the X-ray detector such as a proportional counter, for example, and, after being amplified by a linear amplifier to a specific magnitude without destroying the proportionality relationship, are analyzed in a single-channel pulse-height analyzer.

The output pulses of the linear amplifier respectively become, with the elapse of time, pulses having pulse heights proportional to the energies of the incident X-rays entering the X-ray detector. In the pulse-height analyzer, the analysis range is determined by a preset channel width as indicated in FIG. 10, in which the upper level is called the "upper limit," and the lower level is called the "lower limit," the level of this lower limit being ordinarily called the "base line."

This base line is scanned at a constant speed, but the channel width (width of the region between the upper and lower limits) exists on the base line always with a constant width value. That is, when the base line is at the level A as indicated in FIG. 10, the channel width exists thereabove with a width C, but when the base line is scanned and arrives at the level B, the channel width exists thereabove still with the width C. Therefore, by changing the set position of the baseline by means of the aforementioned switch 13 for selecting the analysis range, it is possible to analyze only the X-rays within a specific wavelength range.

Thus, of the output pulses of the linear amplifier, only those having pulse heights lying between the two preset pulse heights are shaped into output pulses of a specific magnitude by the single-channel pulse-height analyzer, which pulses are then sent to a scaling circuit 14 or a rate meter 15. The rate meter 15 operates to average said pulses with respect to time and converts them into an analog voltage, which is recorded on the chart of an automatic recorder 16.

As a result, a spectrum such as that indicated in FIG. 11 is obtained. FIG. 11 indicates that the number of pulses is small when the aforementioned channel width is at the position A and is large when the channel width is at the position B. Here, this spectrum becomes an energy spectrum with energy level recorded on the horizontal axis and dose recorded on the vertical axis.

The channel selection means and the counter switching means of a multichannel pulse-height analyzer may be intercoupled in a similar manner. One example of a multichannel pulse-height analyzer is illustrated by the block diagram in FIG. 12. In this circuit network, a No. 0 trigger circuit (No. 0 T.C.) operates with respect to pulses of heights greater than $h_0$, and a No. 1 trigger circuit (No. 1 T.C.) operates with respect to pulses higher than $h_1$. The other trigger circuits thereafter are similary adapted to satisfy similar following relationships, $$h_0 < h_1 < h_2 \ldots < h_m < \ldots < h_n < h_{n+1} < \ldots$$

The outputs of the No. $n$ and No. $n+1$ trigger circuit enter a No. $n+1$ anticoincidence circuit (No. $n+1$ A.C.C.). When input pulse height $h$ of the anticoincidence circuit is such that $h_n < h < h_{n+1}$, only the output of the No. $n$ trigger circuit enters the No. $n+1$ anticoincidence circuit, and pulses appear in the output of this anticoincidence circuit. Then, when $h_n$, $h_{n+1} < h_a$, no output appears from the anticoincidence circuit since the outputs of the No. $n$ and No. $n+1$ trigger circuits simultaneous enter thereinto.

These relationships are indicated graphically in FIG. 13. The outputs of the anticoincidence circuits are counted in respective scaling circuits No. 1 (S.C.) through No. $n$ (S.C.), etc. Accordingly, by reading the respective values of these scaling circuits and graphically representing these values, an energy spectrum as illustrated in FIG. 14 can be obtained. Therefore, in the case of this multichannel pulse-height analyzer, by adapting the circuit network so that a suitable number of trigger circuits can be switched by the aforementioned switch 13 for analysis range selecting, it is possible to accomplish analysis of only X-rays of a specific wavelength range.

One example of a No. $n-1$ trigger circuit and a No. $n$ anticoincidence circuit is shown in FIG. 15. The trigger circuit comprises a combination of a beam gate tube 6BN6 and a univibrator 6J6, and the trigger level is equally divided by resistances $R_1$. The potentially difference between the first grids of the beam gate tubes 6BN6 of the No. $n$ and No. $n-1$ trigger circuits becomes the channel width of the No. $n$ trigger circuit, the grid voltage of the No. $n$ trigger circuit being lower than that of the No. $n-1$ trigger circuit.

When a negative rectangular wave appears at the plate of the univibrator 6J6 of the No. $n-1$ trigger circuit, it is differentiated by a capacitor $C_1$ and a resistance $R_2$, and negative and positive pulses are produced and enter the No. $n$ 6BQ7, but since a high negative bias is being applied to the grid of 6BQ7, only the positive pulses are amplified. If, during this operation, a negative rectangular wave of the No. $n$ trigger circuit simultaneously enters the grid of 6BQ7, it cancels said positive pulses, which thereby do not appear in the 6BQ7 output. Anticoincidence operation is thus accomplished.

As one example of a composite-crystal analyzing element suitable for use in the apparatus according to the invention, the following combination may be considered. The analyzing element is formed from built-up films of LiF of a lattice spacing of approximately 2 angstroms as the aforementioned crystal $d$ and of lead stearate of a lattice spacing of approximately 50 angstroms as the crystal $c$. By this combination, the analyzing element is suitable for analysis of wavelengths of from 0.6 to 3.0 angstroms with the LiF and of from 17 to 75 angstroms with the lead stearate.

It is known that satisfactory diffraction can be accomplished with built-up films of lead stearate consisting of approximately 200 film layers. Accordingly, the crystal thickness may be of the order of 1 micron, and, therefore, in the case of a focusing type spectrometer, there is no possibility of the diffraction conditions being affected. Furthermore, since the principal constituents are light elements hydrogen, carbon, and oxygen, the absorption with respect to X-rays to be analyzed with LiF is amply low. Moreover, the higher-order diffracted X-rays due to the lead stearate of from 0.6 to 3 angstroms in wavelength are such that only those of the order 6 with respect to X-rays of 3 angstroms appear and, therefore, do not present a problem.

As described above, it is possible by the practice of the present invention to widen the range of wavelengths of X-rays which can be analyzed without resorting to rotation of the analyzing elements or other methods of interchanging thereof as in the prior art. Accordingly, since there is no necessity of interchanging crystals once the analyzing element is set, there is no possibility of the diffraction conditions and other characteristics of the X-ray spectrometer being disturbed.

Furthermore, when suitable detectors are interchangeably used in accordance with the analysis wavelength, such a procedure, in comparison with the exchanging of analyzing crystals, is much easier and does not disturb the diffraction conditions. Accordingly, the work involved in the conventional procedure of interchanging analyzing crystals and detectors in accordance with the analysis wavelengths is reduced by approximately one-half in the apparatus of the invention, in which, moreover, the adjustment can be carried out without disturbance of the diffraction conditions.

In addition, the present invention further affords highly accurate analysis without the necessity of interchanging detectors through the use of a universal type detector comprising detectors, such as proportional counters, having energy resolving power in conjunction with a pulse-height analyzer, the analysis range of which is varied in accordance with the analysis wavelength range.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claim.

What I claim is:

1. An apparatus for analyzing X-rays emitted from a specimen comprising: an analyzing element consisting of a laminated combination of a first analyzing crystal having relatively narrow spacing and a second analyzing crystal having relatively wide lattice spacing; an X-ray source for projecting said X-rays to the analyzing element; an X-ray detecting device provided with two detectors having energy resolving power, one of which is used to detect the X-rays of short wavelength diffracted by said first analyzing crystal and the other is used to detect the X-rays of long wavelength diffracted by said second analyzing crystal; a pulse-height analyzer for analyzing output pulses of said X-ray detecting device; first switching means for changing over the two detectors in accordance with the wavelength of the X-ray to be analyzed; and second switching means for changing over the analysis wavelength range of the pulse-height analyzer in cooperation with the first switching means, said analyzing element, the X-ray source and the X-ray detecting device being commonly disposed on the circumference of one Rowland circle.

References Cited

UNITED STATES PATENTS

| | | | |
|---|---|---|---|
| 2,835,820 | 5/1958 | Birks | 250—51.5 |
| 3,163,754 | 12/1964 | Bigelow | 250—51.5 |

RALPH G. NILSON, *Primary Examiner.*

A. L. BIRCH, *Assistant Examiner.*